United States Patent
Thubert et al.

(10) Patent No.: US 11,894,939 B2
(45) Date of Patent: Feb. 6, 2024

(54) VALIDATION OF CURRENCY AND AUTHENTICITY OF A CONFERENCE PARTICIPANT'S VIDEO IMAGE

(71) Applicant: Cisco Technology, Inc., San Jose, CA (US)

(72) Inventors: Pascal Thubert, Roquefort-les-Pins (FR); Patrick Wetterwald, Mouans Sartoux (FR); Eric Levy-Abegnoli, Valbonne (FR); Jonas Zaddach, Antibes (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 65 days.

(21) Appl. No.: 17/317,124

(22) Filed: May 11, 2021

(65) Prior Publication Data

US 2022/0368547 A1 Nov. 17, 2022

(51) Int. Cl.
*H04L 12/18* (2006.01)
*G06V 40/40* (2022.01)
*G06V 40/16* (2022.01)

(52) U.S. Cl.
CPC ........ *H04L 12/1822* (2013.01); *G06V 40/168* (2022.01); *G06V 40/40* (2022.01)

(58) Field of Classification Search
CPC ........... G06V 40/40; H04N 7/15; H04N 7/155
See application file for complete search history.

(56) References Cited

U.S. PATENT DOCUMENTS

| | | | | |
|---|---|---|---|---|
| 5,933,502 | A * | 8/1999 | Aucsmith | G06V 10/141 |
| | | | | 713/168 |
| 8,411,909 | B1 * | 4/2013 | Zhao | G06V 40/40 |
| | | | | 382/116 |
| 10,108,871 | B2 * | 10/2018 | Derakhshani | G06V 40/45 |
| 10,867,492 | B1 * | 12/2020 | Lev | G08B 13/19686 |
| 11,030,739 | B2 * | 6/2021 | Watanabe | H04N 9/3176 |
| 11,256,792 | B2 * | 2/2022 | Tussy | G06V 10/17 |
| 11,334,755 | B1 * | 5/2022 | Joshi | G06V 40/40 |
| 2010/0134250 | A1 | 6/2010 | Chung et al. | |
| 2010/0299530 | A1 * | 11/2010 | Bell | G06V 40/18 |
| | | | | 382/117 |
| 2016/0140405 | A1 * | 5/2016 | Graumann | G06V 40/40 |
| | | | | 382/118 |
| 2018/0063495 | A1 * | 3/2018 | Todeschini | H04N 9/3185 |

(Continued)

OTHER PUBLICATIONS

Momina Masood et al., "Deepfakes Generation and Detection: State-of-the-art, open challenges, countermeasures, and way forward", arxiv, Feb. 25, 2021, 42 pages.

*Primary Examiner* — Brian T Pendleton
*Assistant Examiner* — Frank Johnson
(74) *Attorney, Agent, or Firm* — Edell, Shapiro & Finnan, LLC

(57) ABSTRACT

Techniques are provided that validate a participant in a video conference. As a video conferencing system is remote from a video conference participant, and user devices are not trusted, traditional methods such as client side facial recognition are ineffective at validating a participant from a video conferencing system. Thus, the embodiments encode modulated data for projection onto a face of the participant. A video of the participant is then captured. The conferencing system then confirms that the modulated data is present in the captured video.

24 Claims, 6 Drawing Sheets

(56) References Cited

U.S. PATENT DOCUMENTS

| | | | |
|---|---|---|---|
| 2018/0083978 A1 | 3/2018 | Pantazelos | |
| 2019/0052839 A1 | 2/2019 | Farrell et al. | |
| 2019/0179594 A1* | 6/2019 | Alameh | G06F 21/32 |
| 2019/0207932 A1* | 7/2019 | Bud | G07C 9/257 |
| 2019/0213312 A1* | 7/2019 | Tussy | G06Q 20/3276 |
| 2020/0134342 A1* | 4/2020 | Parupati | G06V 10/811 |
| 2020/0218915 A1* | 7/2020 | Jakubiak | G06V 40/172 |
| 2020/0380493 A1* | 12/2020 | Morales | G06Q 20/3274 |
| 2020/0394392 A1 | 12/2020 | Wang et al. | |
| 2021/0168347 A1* | 6/2021 | Margolin | H04N 23/11 |
| 2021/0200843 A1* | 7/2021 | Neuneker | G06F 21/32 |
| 2022/0284228 A1* | 9/2022 | Li | H04N 5/33 |

\* cited by examiner

US 11,894,939 B2

VALIDATION OF CURRENCY AND AUTHENTICITY OF A CONFERENCE PARTICIPANT'S VIDEO IMAGE

TECHNICAL FIELD

The present disclosure relates to validating a video image. Specifically, in some embodiments, video images of a video teleconference are validated.

BACKGROUND

Video conferencing has become an essential tool of the modern workplace. Recent concerns with in-person meetings have driven the use of video conferencing to new heights. Video conferencing is literally changing the nature of the modern workplace. Industries previously resistant to virtual offices have embraced the paradigm in order to survive and even thrive. While video conferencing holds much promise in enabling the virtual organization, it also presents some security risks.

DESCRIPTION OF EXAMPLE EMBODIMENTS

Overview

Figure 1:
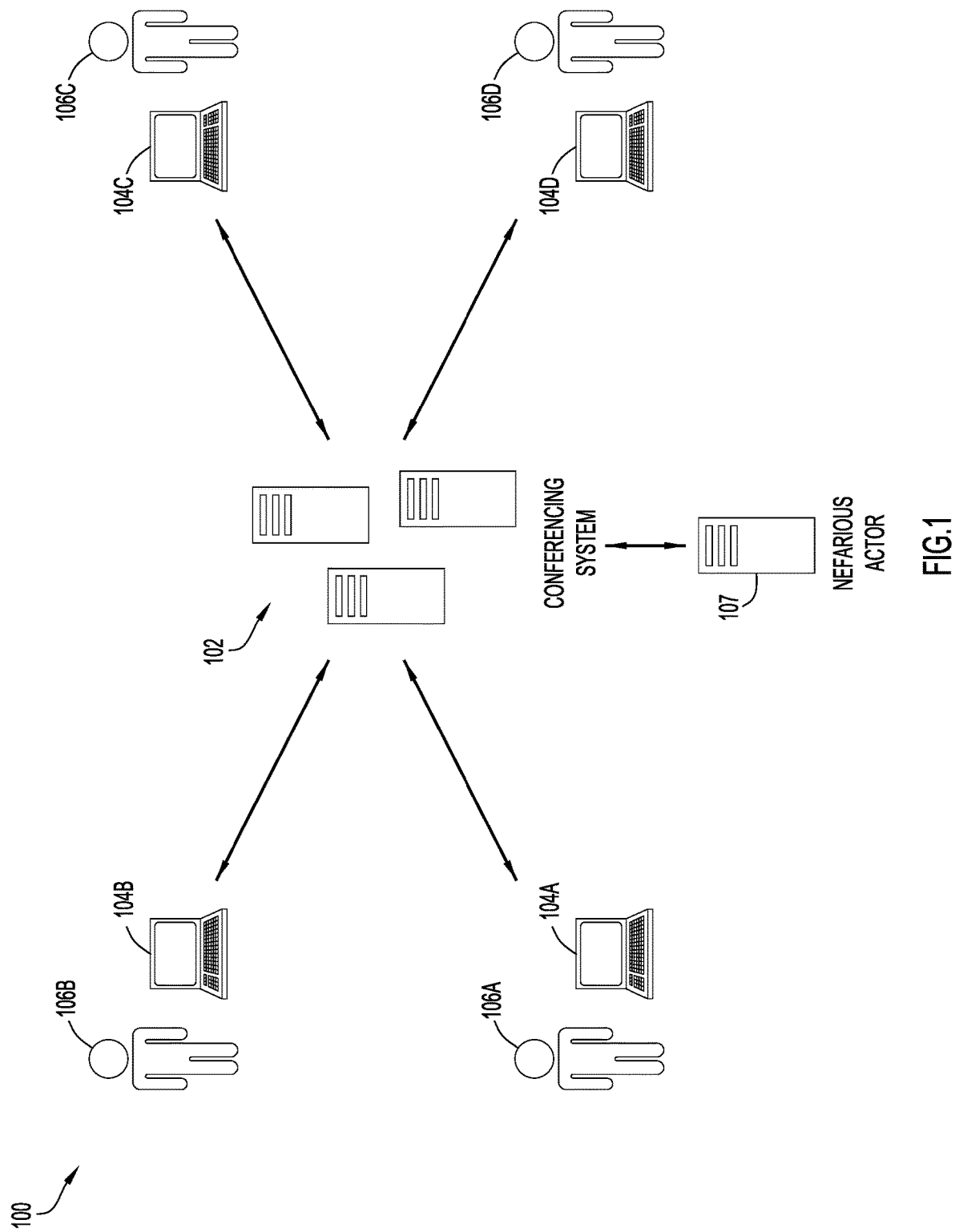
FIG. 1 is a high-level diagram of a video conferencing environment in which the video validation techniques presented herein are employed, according to an example embodiment.

One aspect disclosed herein is a method for validating a participant's image in a video conference. The method includes establishing a first session with a participant user device to include a participant associated with the participant user device in a video conference. The method also includes transmitting, via the first session, modulated data, and receiving, via the first session, a video stream associated the participant. The modulated data is then conditionally detected in the received video stream. The participant user device remains included in the video conference based on whether the modulated data is detected in the video stream.

EXAMPLE EMBODIMENTS

The importance of collaboration tools in the modern enterprise continues to increase. Not only are collaboration tools used for remote conferencing, but in some cases, these tools are employed to facilitate remote signatures or approvals of decisions having substantial impact to a business or organization. Thus, there is a need to ensure that an individual represented by a video conferencing session is authentic. The increasing availability of sophisticated impersonation techniques (such as those provided by modern "deep fake" technology) threatens to undermine the reliability and security of collaboration tools for use in the enterprise. For example, recent developments in video conferencing plug-ins allow modification of a user's appearance. As an example, some large business organizations have created video conference plug-ins that allow modification of an individual's appearance in a manner that reinforces their organizational message. Thus, while the application programming interfaces (APIs) used to support these plug-ins have many productive applications, they also open the door for exploitation by nefarious actors.

Within this context, some solutions already exist to verify presence of an individual. For example, some solutions analyze an identification card, driver's license, or other official document to validate an individual's identity and the validity of the identification presented. However, these systems generally operate on fixed images and do not contemplate identity verification via a video image. Other systems are more sophisticated. For example, mobile operating system vendors provide facial recognition capabilities that project a light pattern on a mobile device user, and verify, based on an image or three dimensional map collected from an on-board camera, that the user is authentic. Some of these capabilities also consider movement of the face over time to verify the image is live and not simply a photograph of the individual that is held in front of the camera. These solutions rely on the integrated identification solution provided by the mobile device that includes not only the mobile device itself, but also the projection system, and the camera system. Thus, because the hardware performing the verification is integrated within a single device, the solution ensures the data being relied upon for the authentication is valid.

In the case of a video conference/collaboration system, generally there is less integration between hardware components collecting the data used for validation and the collaboration system that is performing and relying upon the validation. Thus, a three-dimensional (3D) facial map allegedly generated by remote hardware could instead simply be replayed by some other device that is controlled by a nefarious actor. Thus, there is a risk that data relied upon by the collaboration system to validate a video conference participant is not based on current and reliable information.

The disclosed embodiments were developed based at least in part on a recognition of a weakness in these existing solutions. In particular, when existing solutions verify a user's presence, these solutions benefit from a hardware component of the recognition system being collocated with authentication and authorization software. Due to this collocation, it is assured that the individual being validated is physically present at the time of the validation. Collaboration or video conferencing systems do not have the benefits of this collocation. Furthermore, traditional authentication mechanisms are vulnerable to compromise, and thus are insufficient to validate a user's presence during a video conference session.

In light of these observations, the disclosed embodiments ensure validity of a video conference participant by generating a session unique and modulating pattern of encoded data and transmitting the encoded data to a participant user device. The data pattern is modulated such that validation can be continuous throughout the video conference or as needed. In some embodiments, the pattern is a series of dots or dashes projected onto a face of the video participant. In some cases, the pattern is encoded as luminosity or color changes to an image displayed on a video screen that is proximate to the participant. In some embodiments, the pattern is projected using infrared wavelengths, while other embodiments use visible light wavelengths. By both projecting a pattern onto a face of the participant, and varying the pattern over time, the disclosed embodiments are able to verify both identity and a time currency of a video image of the participant. Thus, these embodiments verify both that participant that is being imaged and that the participant is being imaged during the video conference.

Some embodiments involve modulating the pattern according to one or more of a Quick Response (QR) code, date, time, location, blinking activity of another participant, or voice of another participant. The modulation is implemented using a variety of techniques. For example, in some embodiments, the modulation is implemented by varying which dots of a projected pattern are active versus dormant during a period of time. In some embodiments, the modulation is implemented by varying a luminosity and/or a color of a video image associated with the video conference and displayed to a participant.

In some embodiments, the projection device and display device are physically separate. For example, in some embodiments, a video associated with the video conference is displayed on a participant's mobile device, and the modulated pattern is projected via an emitter integrated with the mobile device. A separate camera, for example, a camera connected to a laptop computer, captures an image of the participant's face and provides the captured video to the video conferencing system. In other embodiments, the video of the video conference session is displayed on a personal computer or laptop device. The modulated pattern is projected by the personal computer or laptop device, and a video of the participant is captured by a camera on the participant's mobile device, and provided to the video conferencing system. This separation of devices such that one device provides for the projection of the modulated pattern and a second device captures an image of the projected pattern improves security in that if one device is comprised, the second device remains potentially secure and makes compromising the entire participant side portion of the solution more difficult.

In some embodiments, the disclosed video conferencing systems operate in concert with identity verification methods integrated with the participant user device. For example, some embodiments include a secure participant device application that is able to verify the user's identity via a local identity verification method (e.g. "Face ID" or "Touch ID"), and/or provide a secure indication of the user's location to the video conferencing system.

FIG. 1 is an overview diagram of a video conferencing environment implemented according to an example embodiment. FIG. 1 shows a video conferencing environment 100 that includes a video conferencing system 102 in communication with five different participant user devices. The participant user devices includes a first participant user device 104A, second participant user device 104B, third participant user device 104C, four participant user device 104D, and a fifth participant user device 107. Each of the first four participant user devices has a corresponding valid user, shown as user 106A, user 106B, user 106C, and user 106D, respectively. The fifth participant user device does not have a valid user, but is instead under the control of a nefarious user. Thus, in some embodiments, the fifth participant user device 107 obtains access to a video conference session hosted by the video conferencing system 102 via authentication credentials that were compromised. Alternatively, the fifth participant user device 107 was able to obtain access to the video conference via other illicit means.

Each of the video conference participant user devices establishes connectivity with the video conferencing system 102. Collectively, these connections with the video conferencing system 102 are integrated into a video conference session, with input and output from each participant user device session shared with the other participant user devices by the video conferencing system 102. The participant user devices may be laptop computers, desktop computers, mobile phones, tablets or any computing device now known or hereinafter developed that includes a means to display video content and capture video. Deep fake technology may employ a machine learning model to replace, within the video conference session, the nefarious actor's image and voice with that of an individual rightfully/legitimately associated with a legitimate user account utilized by the nefarious actor in order to attend the video conference. This replacement deceives other participants of the video conference session from recognizing that the individual accessing the video via the legitimate user account is not the individual rightfully/legitimately associated with the user account.

The disclosed embodiments seek to identify this nefarious replacement of a legitimate user's image with that of the nefarious actor. While technology exists to validate an image of a user at a device (e.g., many mobile device platforms collect biometric face scans to authorize device access), the task of validating a video conference participant is more complex, as the device performing the validation (e.g., the video conferencing system 102) is not proximate to (or collocated with) the individual being validated. As such, the device performing the validation needs to rely on data collected from another device (e.g., a participant user device such as any of the participant user devices 104A-D), which is not secure.

To accomplish this validation under these conditions, the disclosed embodiments provide a modulated validation signal (or modulated data) to a participant user device. For example, some participant user devices include an infrared flood illuminator and dot projector capable of projecting an image (e.g., dots and/or lines) onto a face of a video conference participant. In some embodiments, the modulated validation signal is provided to the participant user device by the conferencing system, and the participant user device projects the modulated data onto the face of the participant via the infrared flood illuminator. In some other embodiments, the validation signal defines different levels of luminosity or color of a video display. For example, the validation signal is embedded in a display signal sent to the participant user device in some embodiments. The changes in display luminosity or color are reflected by the face of the participant, and captured by an imaging sensor.

A video of the participant's face as it reflects the modulated data is captured by an imaging sensor that is proximate to the participant's user device. The captured video is provided back to the video conferencing system 102, which detects the modulated data in the video and compares it to the modulated data it provided to the participant user device. If the two signals are sufficiently similar, the video of the participant is considered validated, at least in some embodiments. When validated, the connectivity to the video conference session established for the participant user device remains open, and integrated with the video conference session hosted by the video conferencing system 102. If the two modulated data sets are not sufficiently similar, some embodiments raise an alert, for example, notifying a host or video conferencing system administrator of the validation failure. Some embodiments disconnect the connection to the video conference session with the participant user device, to avoid risk that further content of the video conference session is disclosed to the invalidated participant/participant user device.

Figure 2:
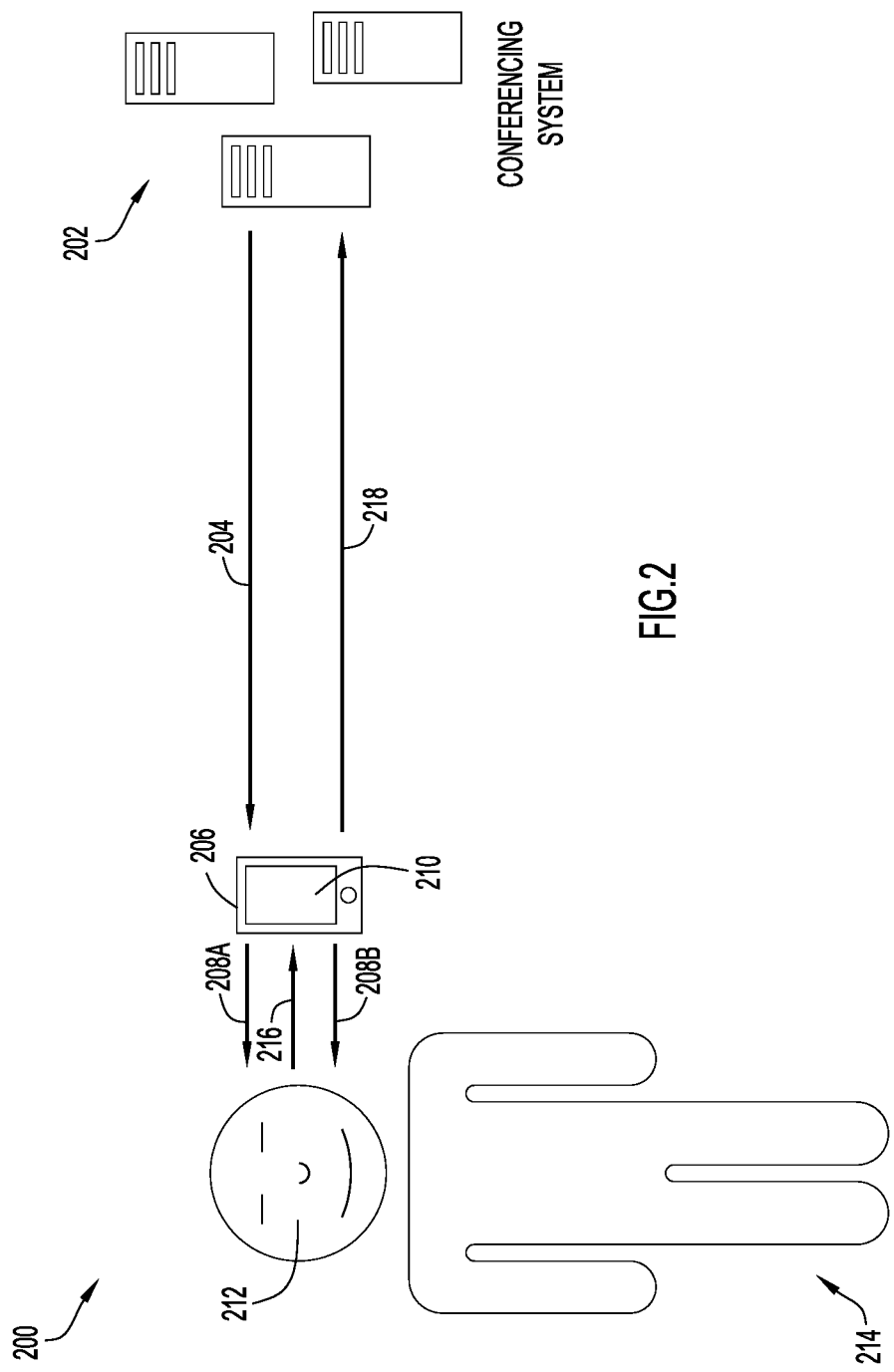
FIG. 2 illustrates a technique for capturing a video including modulated data that is projected onto a face of a participant of a conference in accordance with an example embodiment.

FIG. 2 illustrates a video conferencing environment 200 that captures, in accordance with an example embodiment, a video including modulated data that has been projected onto a face of a participant. FIG. 2 shows that a video conferencing system 202 transmits modulated data 204 to a participant user device 206. The participant user device projects second modulated data, shown as modulated data 208A and modulated data 208B) that is based on the modulated data 204. As discussed above, some embodiments of the participant user device 206 include an infrared flood illuminator and dot projector which project the signal (shown as modulated data 208A and modulated data 208B) onto the face 212. In other embodiments, the participant user device 206 projects the modulated data 204 as a series of luminosity or color changes to a display 210 of the participant user device 206.

A face 212 of a participant 214 reflects the second modulated data (shown as modulated data 208A and 208B) as reflected signal 216, which is captured by an imaging sensor of the participant user device 206. The participant user device 206 then transmits the captured reflected signal as signal 218 back to the video conferencing system 202.

As described above, some embodiments of the video conferencing system 202 work in concert with security features of the participant user device 206. For example, in some embodiments, a secure application is installed on the participant user device 206 that provides a secure communications capability between the participant user device 206 and the video conferencing system 202. The secure application interfaces, in some embodiments, with positioning equipment (e.g., a GPS receiver) integrated with the participant user device 206 to obtain secure location information. This location information is then provided to the video conferencing system 202 by the secure application. The location information is then used by the video conferencing system 202 to verify the participant 214 location is in accordance with expectations.

Furthermore, in some embodiments, the secure application installed on the participant user device 206 is able to invoke identity verification capabilities integrated with the participant user device 206. For example, in some embodiments, the secure application validates an identity of the participant 214 using facial recognition and/or other biometric recognition capabilities (e.g. fingerprint/touch) available locally at the participant user device 206. Results of these validations are provided to the video conferencing system 202. In some embodiments, the video conferencing system 202 incorporates these results when determining whether to validate the participant 214.

Figure 3:
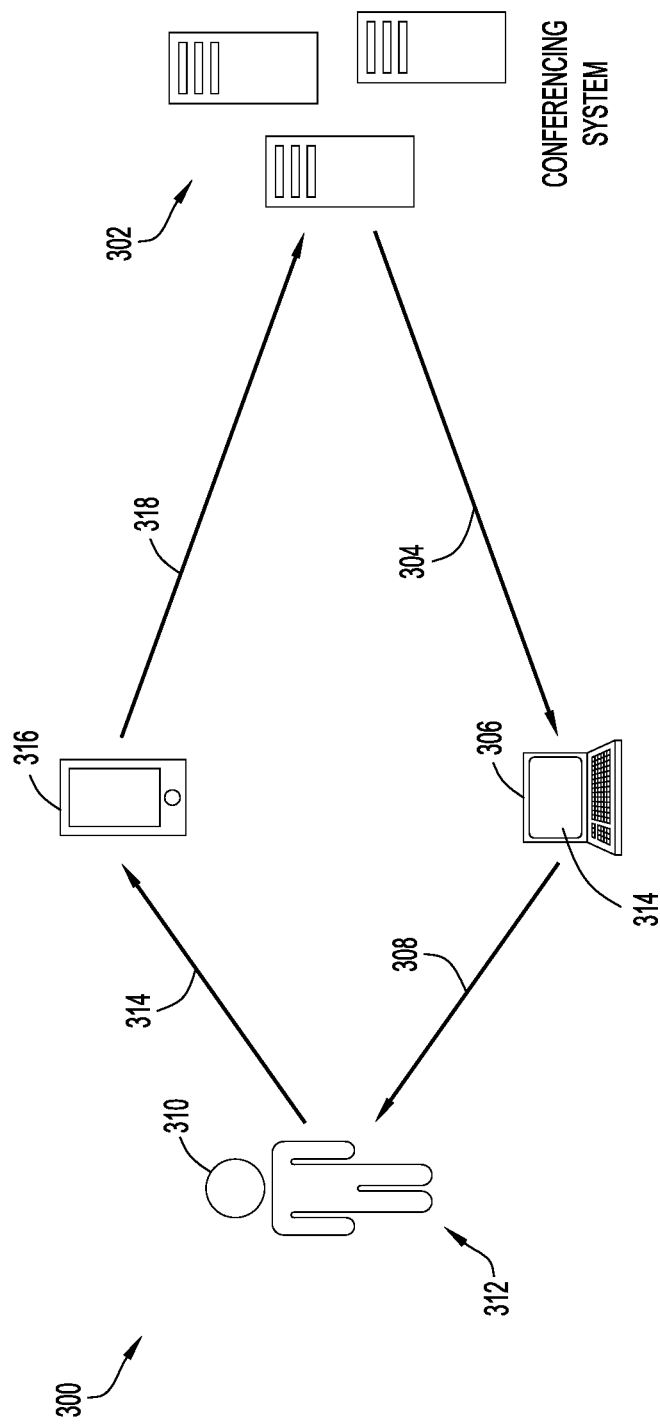
FIG. 3 illustrates another technique of capturing a video including modulated data that is projected onto a face of a participant of a conference in accordance with another example embodiment.

FIG. 3 illustrates a video conferencing environment 300 that captures, in accordance with an example embodiment, a video that includes modulated data. The modulated data is projected onto a face of a participant of a conference. FIG. 3 shows a video conferencing system 302 generates modulated data 304. The modulated data 304 is received by a first device 306. In some embodiments, the first device 306 establishes a session with the video conferencing system 302. In some embodiments, the session established between the first device 306 and the video conferencing system 302 is specially designated as a projection session. As a projection session, the video conferencing system 302 provides the modulated data 304 to the first device 306, but does not necessarily receive video and/or audio input from the first device 306. Upon receiving the modulated data 304, the first device 306 projects a second signal, denoted as projected and modulated data 308, onto a face 310 of a participant 312. As discussed above, in some embodiments, the first device 306 includes an infrared flood illuminator and dot projector. Alternatively, the projection of the modulated data 304 as the projected and modulated data 308 is accomplished via changes in a luminosity or color of an image displayed on a display 314 of the first device 306. A second device 316 captures a video of the face 310 as the face 310 reflects the projected and modulated data 308. The second device 316 is a participant user device that, in at least some embodiments, establishes a connection with the video conferencing system 102, and exchanges audio and display data with the video conferencing system 302 that is integrated into a video conference session hosted by the video conferencing system 302. Thus, FIG. 3 illustrates a partitioning of the functions described above with respect to FIG. 2 as performed by one device, as instead being performed by two devices. In FIG. 3, one device projects the modulated data 304 onto the face 310 of the participant 312, while the second device 316 captures a reflected version of the projected and modulated data 308 and provides the captured video 318 to the video conferencing system 302. FIG. 3 provides some security advantages relative to FIG. 2, in that in order to compromise the validation mechanism provided by the modulated data, a nefarious actor would be required to compromise at least each of the first device 306 and second device 316.

Similar to embodiments described above with respect to the participant user device 206, some embodiments of the video conferencing system 302 work in concert with security features of the second device 316, such as location determination, facial recognition, touch recognition, to validate an identity of the participant 312. Results of these operations are provided to the video conferencing system 302, which considers these results when determining whether to validate the participant 312.

Figure 4:
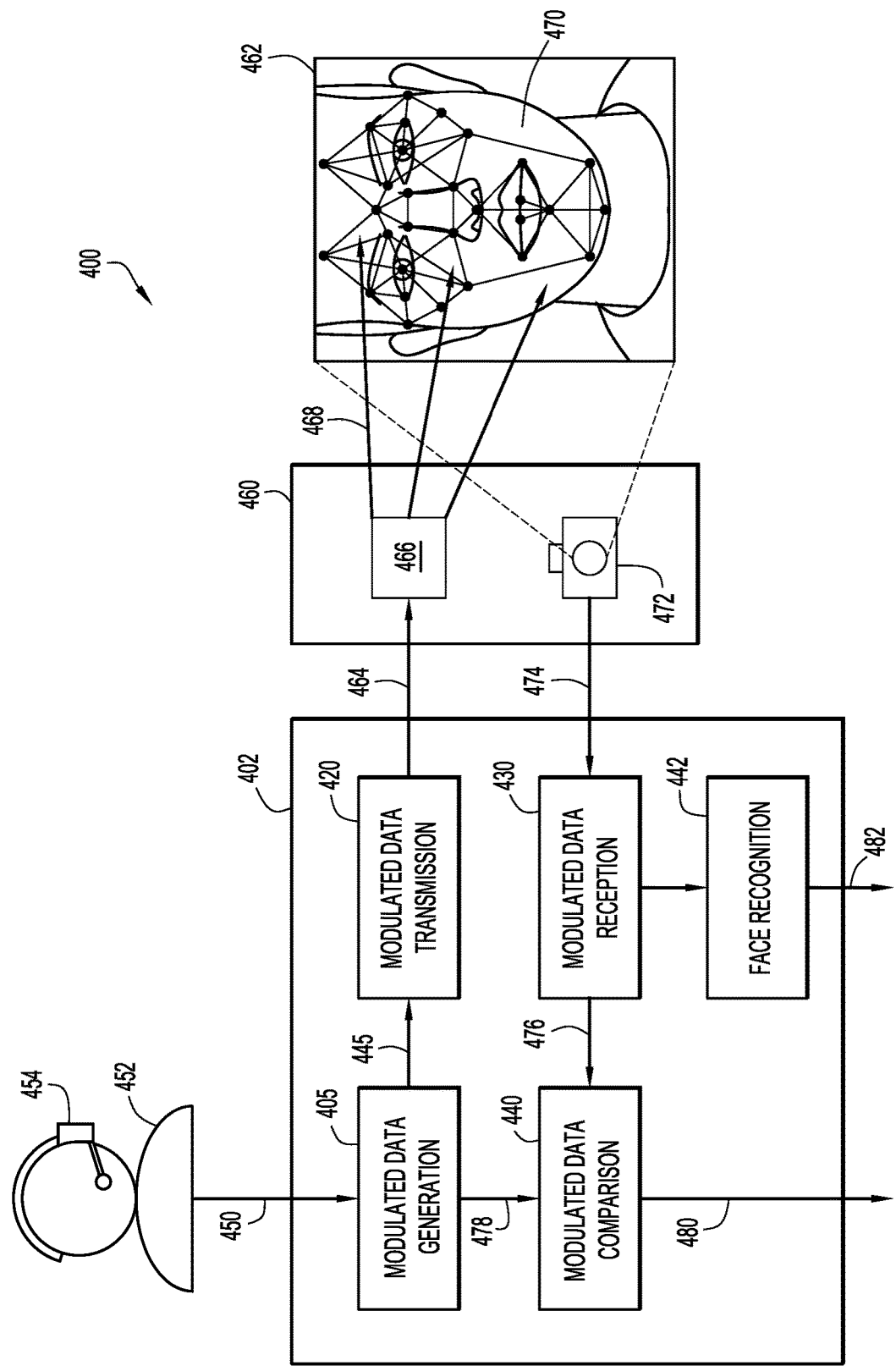
FIG. 4 is a diagram of a video validation process employed in a video conferencing system in accordance with an example embodiment.

FIG. 4 is a diagram showing a video validation process within a video conferencing system in accordance with an example embodiment. A video conferencing system 400 performs a modulated data generation operation 405, modulated data transmission operation 420, a modulated data reception operation 430, a modulated data comparison operation 440, and a facial recognition operation 442. The modulated data generation operation 405 generates modulated data 445. The modulated data 445 is varied according to a modulation method implemented by the modulated data generation operation 405. In at least some embodiments, the modulated data 445 is changed at a certain frequency. For example, the modulated data 445 is modified at 5 MHz, 10 MHz, 15 MHz, or any other frequency/periodicity. In some embodiments, the modulated data 445 is generated based on a voice signal 450 received from a video conference participant 452. In these embodiments, the modulated data 445 is generated based on the voice signal 450 picked up from a microphone 454 proximate to the video conference participant 452. In some embodiments, the modulated data 445 is generated so as to define a series of luminosity or color changes in a display signal.

The modulated data 445 is provided to the modulated data transmission operation 420. The modulated data transmission operation 420 transmits the modulated data to a participant user device. In some embodiments, the modulated data transmission operation 420 encodes the modulated data as a light pattern for an infrared flood illuminator and dot projector included in the participant user device 460 (in accordance with the embodiment described above with respect to FIG. 2) or another device proximate to a second participant 462 (in accordance with the embodiment described with respect to FIG. 3). In some embodiments, the modulated data transmission operation 420 embeds the modulated data 445 in a video signal 464 of a video conference including the second participant 462.

Upon receiving the video signal 464 that embeds the modulated data 445, a flood illuminator and dot projector 466 generates a light signal 468 onto a face 470 of the second participant 462. An imaging device 472 (e.g., a camera) captures a video of the face 470 reflecting the light signal 468 (that encodes modulated data) and provides a video signal 474 (via the connection to the video conferencing system 400) to the modulated data reception operation 430. The modulated data reception operation 430 extracts the modulated data from video signal 474, such as by separating the modulated data from other video data included in the video signal 474, such as video of the face 470 of the second participant 462, at least in some embodiments. The extracted modulated data 476 is then provided to the modulated data comparison operation 440. The modulated data comparison operation 440 compares the extracted modulated data 476 to the modulated data 478 generated by the modulated data generator. The result of the comparison is indicated in a validation signal 480. In some embodiments, the modulated data comparison operation synchronizes the modulated data 478 with the extracted modulated data 476, accounting for delays introduced during the transmission, display, reflection, and extraction of the modulated data before reaching the modulated data comparison operation 440. In some embodiments, the modulated data 445 encodes timing information to assist with the synchronization by the modulated data comparison operation. The timing information, in some embodiments, encodes an incrementing counter in the modulated data 445. The modulated data comparison operation then aligns portions of the modulated data 478 and extracted modulated data 476 that encode equivalent counter information, and then performs the comparison based on the aligned data.

In some embodiments, the modulated data reception operation 430 provides the video signal 474 to the facial recognition operation 442, which performs face recognition on the video signal 474. A face recognition signal 482 is generated based on whether the video signal 474 corresponds to a known image of the second participant 462. In some embodiments, reflections of the video signal 464 on the face 470 are used to assist the facial recognition operation 442.

Figure 5:
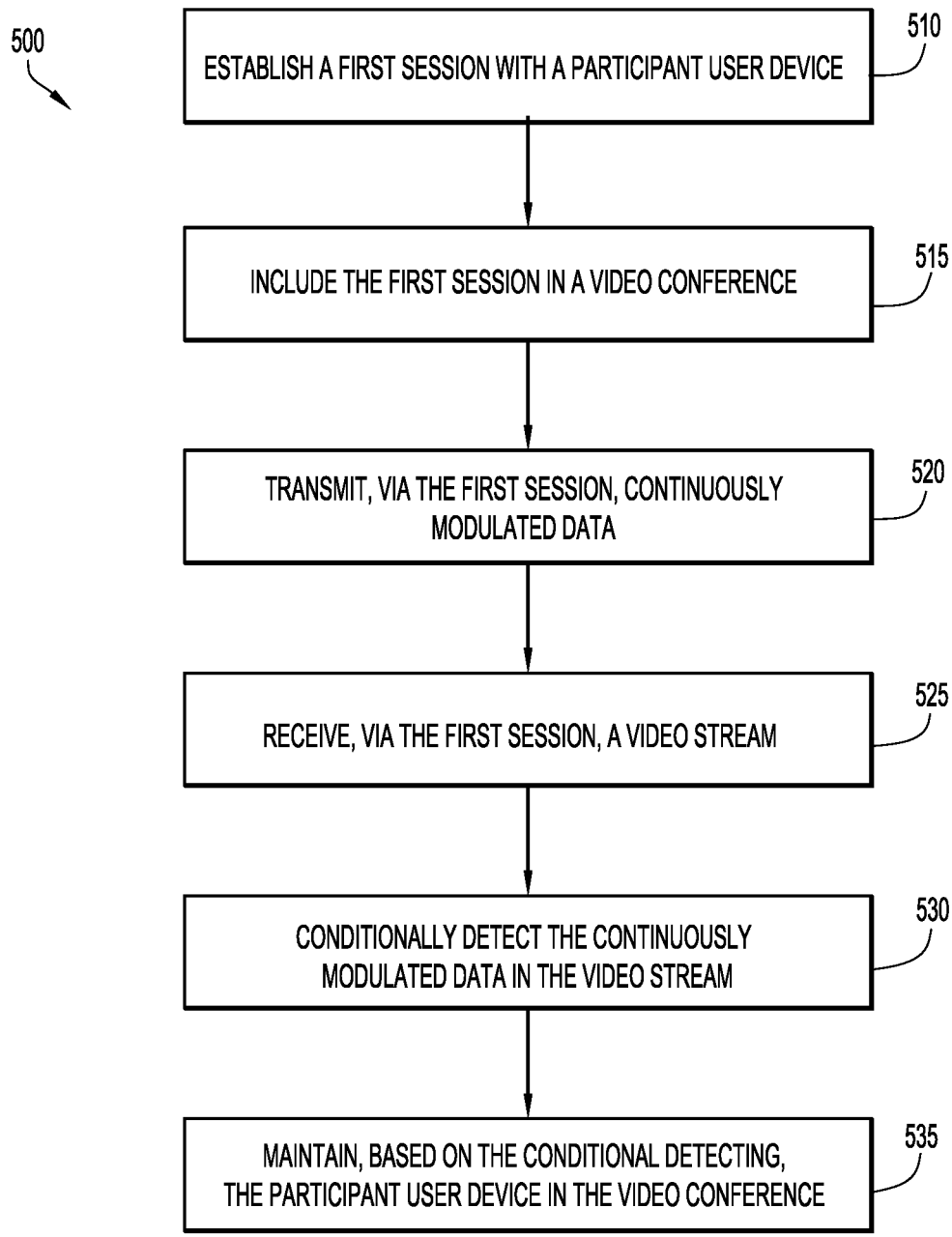
FIG. 5 is a flowchart of a method of validating a video conference participant according to an example embodiment.

FIG. 5 is a flowchart of a method of validating a video conference participant according to an example embodiment. In some embodiments, the method 500 of FIG. 5 is performed by a video conferencing system.

In operation 510, where a first session is established with a participant user device. The participant user device is associated with a video conferencing participant. For example, as discussed above with respect to FIG. 1, in at least some embodiments, a video conferencing system (e.g., video conferencing system 102) establishes one or more sessions with one or more participant user devices (e.g., one or more of participant user devices 104A-D).

In operation 515, the first session is included in a video conference. Including the first session in the video conference includes, in at least some embodiments, streaming media provided by the participant user device (e.g. audio and/or video) to other video conference participants, and streaming media from other video conference participants to the participant user device.

In operation 520, modulated data is transmitted, via the first session, to the participant user device. The modulated data may be continuously modulated in that operation 520 encodes data that is changing at a frequency that does not fall below a predetermined frequency or frequency threshold, such as encoding different data no less than once per 0.1 seconds, 0.2 seconds, 0.3, seconds, 0.4 seconds, 0.5 seconds, 1 second, 2 seconds, 3, seconds, 4 seconds, or 5 seconds. Other lower limits on the frequency of data encoding are also contemplated. Thus, in some embodiments, the modulated data is continuously modulated, in that the encoded data is changed to ensure that video image being provided by a particular user device is timely, or captured within a relatively short elapsed time from when it is received by the video conference system. As discussed above, by modulating the data, the disclosed embodiments provide for both verification of identify and verification of timing of the identity.

As discussed above, the modulated data is generated, in some embodiments, based on an audio or voice signal from a second participant user device that also has a session established with the video conferencing system. Thus, in these embodiments, method 500 includes establishing a second session with a second participant user device to be included in the video conference, receiving an audio signal from the second participant user device, and generating the modulated data based on the received audio signal. In some embodiments, the modulated data is based on blinking activity of the second participant instead of or in addition to the audio signal. Thus, for example, a transition of the second participant's eye from an open state to a closed state generates a first modulated pattern, and a second transition of the second participant's eye from the closed state to the open state generates a second modulated pattern. Alternatively, these transitions define different operations that are performed on modulated data generated via another source (e.g., modulated data generated from the second participant's voice is modified via a first function when the second participant's eye transitions from open to closed, and is modified via a second function when the second participant's eye transitions from closed to open). The modification to the modulated data would encompass a limited portion of the modulated data that is sufficiently proximate to a time of the transition.

In some embodiments, the continuously modulated data encodes an image of dots and/or lines (that are themselves modulated). The image is suitable for projection onto a face of the participant. As discussed above, some embodiments modulate the data by varying which dots are illuminated and which dots are inhibited over time.

In some embodiments, the continuously modulated data include a random component such that the modulated data cannot be predicted by another device. As discussed above, in some embodiments, operation 520 generates the continuously modulated data to include an indicator of timing. For example, in some embodiments, an incrementing (or decrementing) counter is encoded into the continuously modulated data to provide for synchronizing the generated data from a reflected version of the modulated data obtained from a device proximate to the participant. In some embodiments, the continuously modulated data is generated based on a current date, current time or a location of the participant user device. In some embodiments, the continuously modulated data is generated to encode a message. For example, in some embodiments, the continuously modulated data encodes a sequence of QR codes, which are projected onto a face of a participant. The message includes, in some embodiments, a predefined sequence of character encodings and is of a predefined length. In some embodiments, the message is a continuous stream of character encodings.

In operation 525, a video stream associated with the participant is received via the first session. As discussed above with respect to FIG. 4, in some embodiments, the continuously modulated data is embedded into a video stream as luminosity or color changes to a displayed image/video that is provided to the participant user device. Alternatively, in some embodiments, the continuously modulated data is encoded for projection by a flood illuminator and dot projector. A video image of a face of the participant is then captured by an imaging device proximate to the participant. The video stream received via the first session is based on the video images.

Some embodiments receive other indications from the participant user device. For example, some embodiments receive location information from an application installed on the participant user device. Some embodiments also receive results of identity verification operations performed locally on the participant user device. For example, as discussed above, some embodiments complement the identity verification obtained via the modulated data of method 500, with identity verification performed at the participant user device and/or location information obtained from the participant user device.

In operation 530, data derived from the received video stream is analyzed to conditionally detect the continuously modulated data. In some embodiments, operation 530 decodes the continuously modulated data to detect one or more timing indications (such as encoded counters as discussed above), which are then used to synchronize comparisons between the transmitted continuously modulated data and the continuously modulated data derived from the received video stream. Thus, in some embodiments, operation 530 compares, for example, data encoded with a particular time indication in both the transmitted and received modulated data. In some embodiments, an amplitude and/or frequency of the conditionally modulated data transmitted in operation 520 is compared with the continuously modulated data derived from the received video stream.

If the two sets of modulated data are within a threshold tolerance, operation 530 determines that the data match. Otherwise, operation 530 determines the data does not match. As some embodiments encode a message in the continuously modulated data transmitted in operation 520, operation 530 attempts to decode the message from the continuously modulated data derived from the video stream. If the message is successfully decoded, operation 530 determines the two signals match. If the message cannot be identified in the received video, then the two sets of modulated data are determined to not match, at least in embodiments that encode a message.

Operation 535 maintains the participant user device in the video conference based on the conditional detecting of operation 530. For example, if operation 530 determines that the two sets of modulated data are sufficiently similar in amplitude and/or frequency, the participant user device's participation in the video conference is continued or maintained (e.g., video conference data is shared with the participant user device). If the two signals are not sufficiently similar, some embodiments generate an alert, for example, alerting a host of the video conference and/or an administrator of a video conferencing system providing the video conference (e.g., video conferencing system 102). Some embodiments disconnect the first session in response to determining that the transmitted data and the data derived from the received video are not sufficiently similar.

As discussed above, some embodiments further determine whether to maintain the participant user device in the video conference based on location information received from the participant user device. Some embodiments validate location information received from the participant user device against location information associated with the user identity.

Some embodiments of method 500 perform facial recognition on the video received in operation 525. Facial features are extracted from the video and compared to reference facial features of a user associated with the participant user device. As discussed above, the first session is established based on user account credentials, and in some cases, the reference facial features are associated with the user account. Thus, method 500 compares facial features extracted from the video received in operation 525 with the reference features. If a match is identified, the first session is maintained, at least with respect to facial recognition. If no match is found between the reference facial features and those facial features extracted from the video of operation 525, then some embodiments raise an alert and/or disconnect the first session.

Figure 6:
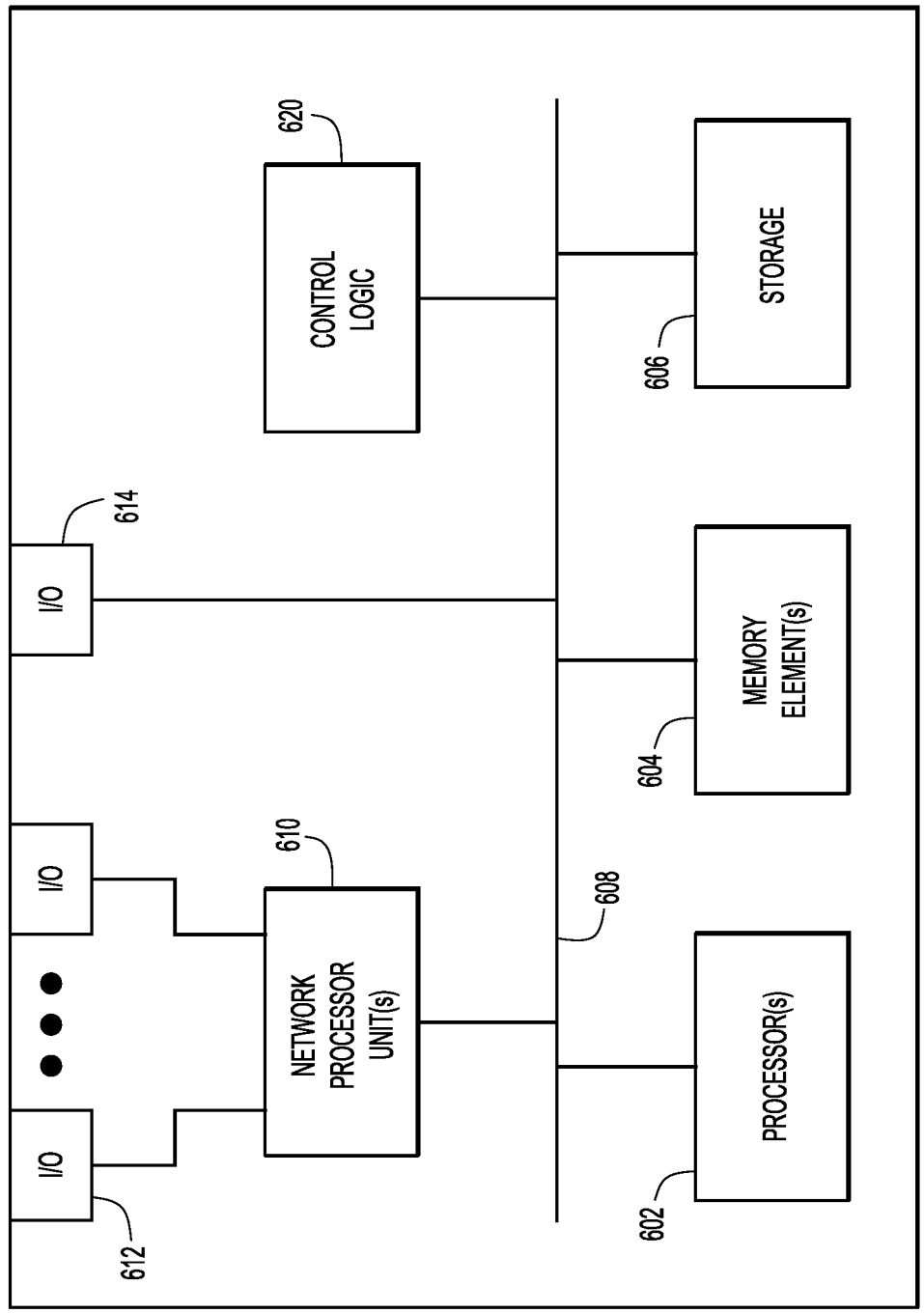
FIG. 6 is a hardware block diagram of a computing device that may perform functions associated with operations discussed herein in connection with the techniques depicted in any one or more of FIGS. 1-5.

FIG. 6 is a hardware block diagram of a computing device 600 that may perform functions associated with operations discussed herein in connection with the techniques depicted in any one or more of FIGS. 1-5. In various embodiments, any of conferencing systems or participant user devices discussed above implement a computing architecture analogous to that described below with respect to the computing device 600. One or more of the video conferencing system 102, video conferencing system 202, video conferencing system 302, or video conferencing system 402 include one or more servers analogous to the computing device 600, each configured to support the video conferences In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that are configured for computing device 600. In at least one embodiment, bus 608 is implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that are connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 600 serves as a user device as described herein. In some embodiments, the computing device 600 supports a display having touchscreen display capabilities.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 8) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises establishing a first session with a participant user device to include a participant associated with the participant user device in a video conference, transmitting, via the first session, modulated data, receiving, via the first session, a video stream associated the participant, conditionally detecting the modulated data in the video stream, and maintaining, based on the conditional detecting, the participant user device in the video conference.

In another form, an apparatus is provided that comprises a network interface configured to enable network communications, one or more processors, and one or more memories storing instructions that when executed configure the one or more processors to perform operations comprising: establishing a first session with a participant user device to include a participant associated with the participant user device in a video conference, transmitting, via the first session, modulated data, receiving, via the first session, a video stream associated the participant; conditionally detecting the modulated data in the video stream, and maintaining, based on the conditional detecting, the participant user device in the video conference.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    establishing, by a video conferencing system, a first session with a first participant user device of a participant to be included in a video conference;
    establishing, by the video conferencing system, a second session with a second participant user device of the participant included in the video conference that is physically separate from and proximate to the first participant user device;
    transmitting, by the video conferencing system via the first session, modulated data to the first participant user device, wherein the modulated data is to be projected onto a face of the participant by the first participant user device;
    receiving, by the video conferencing system via the second session, a video stream associated with the participant from the second participant user device, wherein the video stream includes a reflected version of projected and modulated data that is captured by the second participant user device as the face reflects the projected and modulated data;
    analyzing, by the video conferencing system, the reflected version of the projected and modulated data that is derived from the received video stream by comparing the reflected version of the projected and modulated data received from the second participant user device with the modulated data transmitted to the first participant user device;
    conditionally detecting, by the video conferencing system, the modulated data in the video stream if the reflected version of the projected and modulated data received from the second participant user device matches the modulated data transmitted to the first participant user device within a threshold similarity level based on the analyzing; and
    maintaining, based on the conditionally detecting, the second participant user device in the video conference.

2. The method of claim 1, further comprising generating an alert in response to a failure to detect the modulated data in the video stream.

3. The method of claim 1, further comprising generating the modulated data based on a date, time or location of at least one of the first participant user device or the second participant user device of the participant.

4. The method of claim 1, further comprising:
    encoding a message as a sequence of QR codes; and
    generating the modulated data based on the sequence of QR codes;
    wherein the conditionally detecting of the modulated data in the video stream comprises verifying whether the message is decoded from the video stream.

5. The method of claim 1, further comprising:
    receiving, by the video conferencing system via the second session, an audio signal from the second participant user device; and
    generating, by the video conferencing system, the modulated data based on the audio signal.

6. The method of claim 1, further comprising:
    modulating a luminosity or color of a video signal in accordance with the modulated data,
    wherein the transmitting of the modulated data to the first participant user device comprises transmitting the video signal such that the modulated luminosity or color embedded therein is projected onto the face of the participant by displaying the video signal on a display screen of the first participant user device, and
    wherein the conditionally detecting of the modulated data in the video stream comprises verifying whether changes in the modulated luminosity or color are reflected by the face of the participant and captured by an imaging device of the second participant user device in the video stream associated with the participant.

7. The method of claim 6, wherein the modulated luminosity or color embedded in the video signal is projected onto the face of the participant by displaying the video signal on the display screen using visible light wavelengths.

8. The method of claim 1, further comprising:
    generating a projection signal including an image of dots or lines, wherein the dots or lines are modulated according to the modulated data,
    wherein the transmitting of the modulated data to the first participant user device comprises transmitting the projection signal such that the image having the modulated dots or lines encoded therein is projected onto the face of the participant via an emitter integrated in the first participant user device, and
    wherein the conditionally detecting of the modulated data in the video stream comprises verifying whether changes in the modulated dots or lines are reflected by the face of the participant and captured by an imaging device of the second participant user device in the video stream associated with the participant.

9. The method of claim 8, further comprising recognizing the face of the participant in the second session based on the video stream and the projection signal, wherein the maintaining is based on the recognizing.

10. The method of claim 8, wherein the image having the modulated dots or lines encoded in the video signal is projected onto the face of the participant via the emitter using infrared wavelengths.

11. The method of claim 1, wherein the modulated data is continuously modulated such that the modulated data is modified at a frequency that does not fall below a predetermined frequency.

12. The method of claim 1, wherein the modulated data that is transmitted by the video conferencing system via the first session is projected onto the face of the participant using a display screen of the first participant user device, and wherein the reflected version of the projected and modulated data in the video stream that is received by the video conferencing system via the second session is captured using a camera of the second participant user device.

13. The method of claim 1, wherein the modulated data that is transmitted by the video conferencing system via the first session is projected onto the face of the participant using an emitter of the first participant user device, and
wherein the reflected version of the projected and modulated data in the video stream that is received by the video conferencing system via the second session is captured using an imaging sensor of the second participant user device.

14. An apparatus comprising:
a network interface configured to enable network communications;
one or more processors; and
one or more memories storing instructions that when executed configure the one or more processors to perform operations of a video conferencing system comprising:
establishing a first session with a first participant user device of a participant to be included in a video conference;
establishing a second session with a second participant user device of the participant included in the video conference that is physically separate from and proximate to the first participant user device;
transmitting, via the first session, modulated data to the first participant user device, wherein the modulated data is to be projected onto a face of the participant by the first participant user device;
receiving, via the second session, a video stream associated with the participant from the second participant user device, wherein the video stream includes a reflected version of projected and modulated data that is captured by the second participant user device as the face reflects the projected and modulated data;
analyzing the reflected version of the projected and modulated data that is derived from the received video stream by comparing the reflected version of the projected and modulated data received from the second participant user device with the modulated data transmitted to the first participant user device;
conditionally detecting the modulated data in the video stream if the reflected version of the projected and modulated data received from the second participant user device matches the modulated data transmitted to the first participant user device within a threshold similarity level based on the analyzing; and
maintaining, based on the conditionally detecting, the second participant user device in the video conference.

15. The apparatus of claim 14, the operations further comprising generating an alert in response to a failure to detect the modulated data in the video stream.

16. The apparatus of claim 14, the operations further comprising generating the modulated data based on a date, time or location of at least one of the first participant user device or the second participant user device of the participant.

17. The apparatus of claim 14, the operations further comprising:
encoding a message as a sequence of QR codes; and
generating the modulated data based on the sequence of QR codes;
wherein the conditionally detecting of the modulated data in the video stream comprises verifying whether the message is decoded from the video stream.

18. The apparatus of claim 14, the operations further comprising:
receiving via the second session an audio signal from the second participant user device; and
generating the modulated data based on the audio signal.

19. The apparatus of claim 14, the operations further comprising modulating a luminosity or color of a video signal in accordance with the modulated data,
wherein the transmitting of the modulated data to the first participant user device comprises transmitting the video signal such that the modulated luminosity or color embedded therein is projected onto the face of the participant by displaying the video signal on a display screen of the first participant user device, and
wherein the conditionally detecting of the modulated data in the video stream comprises verifying whether changes in the modulated luminosity or color are reflected by the face of the participant and captured by an imaging device of the second participant user device in the video stream associated with the participant.

20. The apparatus of claim 14, the operations further comprising generating a projection signal including an image of dots or lines, wherein the dots or lines are modulated according to the modulated data,
wherein the transmitting of the modulated data to the first participant user device comprises transmitting the projection signal such that the image having the modulated dots or lines encoded therein is projected onto the face of the participant via an emitter integrated in the first participant user device, and
wherein the conditionally detecting of the modulated data in the video stream comprises verifying whether changes in the modulated dots or lines are reflected by the face of the participant and captured by an imaging device of the second participant user device in the video stream associated with the participant.

21. A non-transitory computer readable storage medium comprising instructions that when executed configure one or more processors to perform operations of a video conferencing system comprising:
establishing a first session with a first participant user device of a participant to be included in a video conference;
establishing a second session with a second participant user device of the participant included in the video conference that is physically separate from and proximate to the first participant user device;
transmitting, via the first session, modulated data to the first participant user device, wherein the modulated data is to be projected onto a face of the participant by the first participant user device;

receiving, via the second session, a video stream associated with the participant from the second participant user device, wherein the video stream includes a reflected version of projected and modulated data that is captured by the second participant user device as the face reflects the projected and modulated data;

analyzing the reflected version of the projected and modulated data that is derived from the received video stream by comparing the reflected version of the projected and modulated data received from the second participant user device with the modulated data transmitted to the first participant user device;

conditionally detecting the modulated data in the video stream if the reflected version of the projected and modulated data received from the second participant user device matches the modulated data transmitted to the first participant user device within a threshold similarity level based on the analyzing; and maintaining, based on the conditionally detecting, the second participant user device in the video conference.

22. The non-transitory computer readable storage medium of claim 21, the operations further comprising:

encoding a message as a sequence of QR codes; and
generating the modulated data based on the sequence of QR codes;

wherein the conditionally detecting of the modulated data in the video stream comprises verifying whether the message is decoded from the video stream.

23. The non-transitory computer readable storage medium of claim 21, the operations further comprising:

receiving via the second session an audio signal from the second participant user device; and
generating the modulated data based on the audio signal.

24. The non-transitory computer readable storage medium of claim 21, the operations further comprising modulating a luminosity or color of a video signal in accordance with the modulated data, wherein the transmitting of the modulated data to the first participant user device comprises transmitting the video signal such that the modulated luminosity or color embedded therein is projected onto the face of the participant by displaying the video signal on a display screen of the first participant user device, and wherein the conditionally detecting of the modulated data in the video stream comprises verifying whether changes in the modulated luminosity or color are reflected by the face of the participant and captured by an imaging device of the second participant user device in the video stream associated with the participant.

* * * * *